(12) United States Patent
Fimoff et al.

(10) Patent No.: US 7,324,591 B2
(45) Date of Patent: Jan. 29, 2008

(54) ADAPTIVE EQUALIZER

(75) Inventors: Mark Fimoff, Hoffman Estates, IL (US); Sreenivasa M. Nerayanuru, Wheeling, IL (US); Sedar Ozen, Narlidere (TR)

(73) Assignee: Zenith Electronics Corporation, Lincolnshire, IL (US)

( * ) Notice: Subject to any disclaimer, the term of this patent is extended or adjusted under 35 U.S.C. 154(b) by 667 days.

(21) Appl. No.: 10/919,997

(22) Filed: Aug. 17, 2004

(65) Prior Publication Data

US 2006/0039460 A1    Feb. 23, 2006

(51) Int. Cl.
    *H04H 7/30* (2006.01)
(52) U.S. Cl. .................................. 375/233
(58) Field of Classification Search ............. 375/148, 375/230–233, 285, 350
    See application file for complete search history.

(56) References Cited

U.S. PATENT DOCUMENTS

| | | | | |
|---|---|---|---|---|
| 3,136,432 A | * | 6/1964 | Nicoll et al. | 376/271 |
| 5,117,291 A | * | 5/1992 | Fadavi-Ardekani et al. | 348/614 |
| 5,526,378 A | * | 6/1996 | Knutson et al. | 375/229 |
| 6,954,495 B2 | * | 10/2005 | Piirainen | 375/233 |
| 7,072,392 B2 | * | 7/2006 | Xia et al. | 375/233 |

* cited by examiner

*Primary Examiner*—Khanh C. Tran

(57) ABSTRACT

A channel impulse response is determined from a cross-correlation of a received training sequence and a stored version of the transmitted training sequence. The channel impulse response is iteratively cleansed of noise caused by the finiteness of the cross-correlation. Initial values of the tap weights for the taps of an equalizer such as a decision feedback equalizer may be determined based on the cleansed channel impulse response.

24 Claims, 2 Drawing Sheets

ADAPTIVE EQUALIZER

RELATED APPLICATIONS

The present application is related to U.S. patent application Ser. No. 10/142,108 filed on May 9, 2002 and Ser. No. 10/142,110 filed on May 9, 2002.

TECHNICAL FIELD OF THE INVENTION

The present invention relates to equalizers and, more particularly, to equalizers that adapt to the condition of a channel through which signals are received.

BACKGROUND OF THE INVENTION

Equalizers such as adaptive decision feedback equalizers having a plurality of taps are widely used in digital communication receivers in order to provide correction for multipath channel distortion. Adaptive algorithms, such as the least mean squares (LMS) algorithm, are implemented in order to determine the tap weight values for the taps of the equalizer. Such adaptive algorithms are easy to implement and provide reasonably good performance. However, under difficult channel conditions, these algorithms may fail to provide tap weights that converge to the desired values.

It is well known that this failure may be avoided if the tap weights, instead of being initialized to values of zero as is often done, are initialized at least somewhat close to their final desired values based on a knowledge of the channel impulse response (CIR). An estimate of the channel impulse response may be derived from an a priori known training signal periodically transmitted prior to, and/or along with, the unknown data. One such system, in which an a priori known training signal is periodically transmitted prior to, and/or along with, unknown data, is specified in the ATSC 8VSB standard for digital terrestrial television broadcasting.

The channel impulse response is typically estimated in a receiver by cross-correlating the training signal as received with a representation of the known transmitted training signal stored in the receiver. The initial minimum mean square error (MMSE) tap weights may then be calculated from the initial channel estimate utilizing well known methods, such as those described in "Fast Computation of Channel-Estimate Based Equalizers in Packet Data Transmission," IEEE Transactions on Signal Processing, N. Al-Dhahir, J. M. Cioffi, November 1995 and "A Fast Computational Algorithm for the Decision Feedback Equalizer," IEEE Transactions on Communications, I. Lee, J. M. Cioffi, November 1995. The initial tap weights are then provided to the equalizer.

An example of such an equalizer is shown in FIG. 1 as a decision feedback equalizer 10. The decision feedback equalizer 10 comprises a plurality of taps $N_{taps} = N_{FF} + N_{FB}$ whose tap weights are applied to the received signal in order to eliminate the effects of multipath from the received signal. The decision feedback equalizer 10 includes a feed forward filter 12 having feed forward taps $N_{FF}$ and a feedback filter 14 having feedback taps $N_{FB}$.

The operation of the decision feedback equalizer 10 is well known. The input to the feed forward filter 12 is the received data y. The feed forward filter 12 includes a plurality of outputs $14_1$ through $14_n$ and a corresponding plurality of multipliers $16_1$ through $16_n$. The signal on each of the outputs $14_1$ through $14_n$ is multiplied by a corresponding tap weight $g_{FF1}$ through $g_{FFn}$ from a tap weight update algorithm (such as the well known LMS algorithm) by a corresponding one of the multipliers $16_1$ through $16_n$. The outputs from the multipliers $16_1$ through $16_n$ are added together by an adder 18, and the output from the adder 18 is supplied to the plus input of a subtractor 20.

The output of the subtractor 20 is considered the output of the decision feedback equalizer 10. The output of the subtractor 20 is also provided as an input to a non-linear decision device 22 and to the minus input of a subtractor 24. The non-linear decision device 22 operates as a slicer for the data at the output of the subtractor 20. When the non-linear decision device 22 receives training data at its input, the non-linear decision device 22 outputs sliced values of the a priori known training sequence. The output of the decision device 22 supplies sliced values to the input of the feedback filter 14 and to the plus input of the subtractor 24. The subtractor 24 compares the input of the decision device 22 to the output of the decision device 22 so as to form an error e[n] for the LMS algorithm.

The feedback filter 14 includes a plurality of outputs $26_1$ through $26_n$ and a corresponding plurality of multipliers $28_1$ through $28_n$. The signal on each of the outputs $26_1$ through $26_n$ is multiplied by a corresponding tap weight $g_{FB1}$ through $g_{FBn}$ from the above mentioned tap weight update algorithm by a corresponding one of the multipliers $28_1$ through $28_n$. The outputs from the multipliers $28_1$ through $28_n$ are added together by an adder 30, and the output from the adder 20 is supplied to the minus input of the subtractor 20.

When the training sequence is first received, an estimate of the channel impulse response is typically calculated by cross-correlating the training signal as received with a stored version of the known training signal. The training sequence vector s of length N may be defined according to the following equation:

$$s = [s[0] \ldots s[N-1]]^T. \quad (1)$$

The channel impulse response may be defined as having a length L such that $L = (L_a + L_c + 1)$, where $L_a$ is the length of the anti-causal portion of the channel impulse response and $L_c$ is the length of the causal portion of the channel impulse response. A matrix A based on the known training signal may be defined by the following equation:

$$A = \begin{bmatrix} s[0] & 0 & 0 \\ s[1] & s[0] & \\ \vdots & s[1] & \vdots \\ \vdots & \vdots & \ddots \\ s[N-1] & \vdots & 0 \\ 0 & s[N-1] & s[0] \\ \vdots & 0 & s[1] \\ \vdots & \vdots & \ddots & \vdots \\ 0 & 0 & s[N-1] \end{bmatrix}_{(N+L-1) \times L} \quad (2)$$

The real vector of received symbols is designated as y with y[0] being designated as the first received training data element. The vector y of length N+L−1 may then be defined by the following equation:

$$y = [y[-L_a], \ldots, y[0], \ldots, y[L_c + N - 1]]^T. \quad (3)$$

The raw cross-correlation channel estimate is then given by the following equation:

$$\hat{h}_u = \frac{1}{\|s\|^2} A^T y = [h[-L_a] \ldots h[0] \ldots h[L_c]]^T \quad (4)$$

where $\|s\|$ is the 2-norm of s, and where the 2-norm of s is generally given as $\sqrt{|s_1|^2+|s_2|^2+\ldots+|s_n|^2}$.

Then, the initial tap weights of the decision feedback equalizer 10 are calculated utilizing MMSE methods which determine the tap weights for the equalizer based on the matrix A and the channel estimate $\hat{h}_u$.

The present invention provides a novel technique for forming a more accurate estimate of the channel impulse response.

SUMMARY OF THE INVENTION

In accordance with one aspect of the present invention, a method for estimating a channel comprises the following: cross-correlating a known training sequence with received training data to produce a cross-correlation vector, wherein the cross-correlation vector is characterized by a noise component resulting from the finiteness of the cross-correlation; calculating a threshold value that is a fraction of the strength of the main peak of the cross-correlation vector; and, iteratively selecting, scaling, and subtracting correction vectors from a set of correction vectors based on the known training sequence, wherein the correction vectors in the set of pre-stored correction vectors are related to shifted versions of the noise component, and wherein such selections are based on cross-correlation peaks that are above the threshold value to produce a succession of channel estimates of improved accuracy.

In accordance with another aspect of the present invention, a method for estimating a channel comprises the following: (a) cross-correlating a known training sequence with received training data to produce a cross-correlation vector, wherein the cross-correlation vector is characterized by a noise component resulting from the finiteness of the cross-correlation; (b) calculating a threshold value that is a fraction of the strength of the main peak of the cross-correlation vector; (c) selecting and scaling in one step a subset of correction vectors from a set of pre-stored correction vectors based on the known training sequence, wherein the subset of correction vectors is selected based on the threshold value; (d) simultaneous-ly subtracting all of the selected and scaled correction vectors from the cross-correlation vector to produce a new channel estimate; (e) reducing the threshold value by a fixed factor; and, (f) iteratively repeating (c)-(e) until the 2-norm of the difference between the new channel estimate and a previous channel estimate is not greater than a given value.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
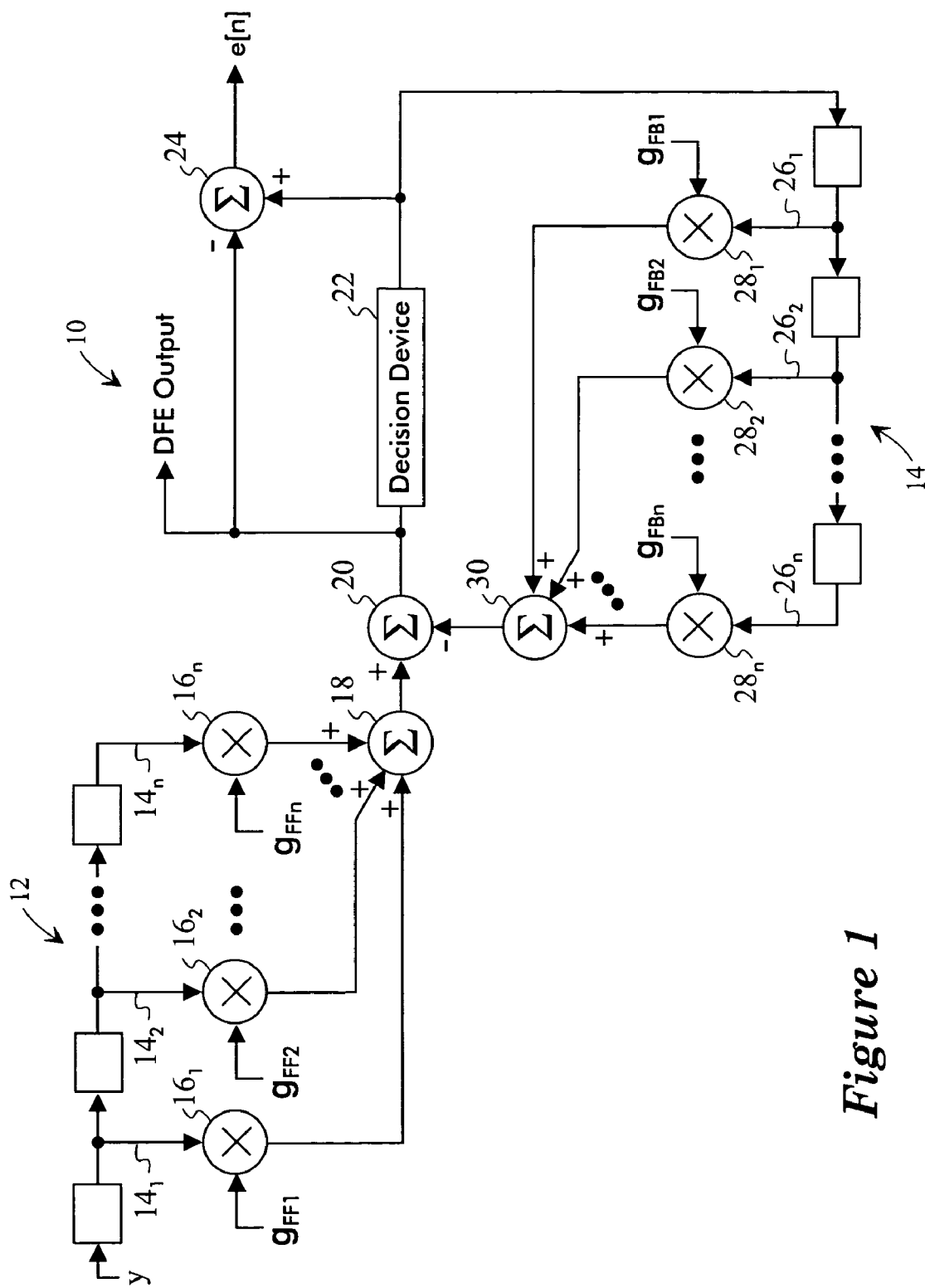
FIG. 1 illustrates a decision feedback equalizer whose tap weights may be adjusted as described above.

Equation (4) results in a cross-correlation vector h having $L=L_a+L_c+1$ elements. The inventors have recognized that, due to the finiteness of the correlation operation as represented by equation (4), the cross-correlation vector h is characterized by an a prior known noise component in the main path and in each reflected (ghost) path in proportion to the relative gain in each respective path. The inventors have also recognized that the vector h may be more accurately estimated by compensating for this noise component.

In general, this compensation is accomplished by deriving a representation of the noise component and by iteratively subtracting it from the main and each dominant reflected path detected in the initial (raw) channel impulse estimate, while taking advantage of a thresholding operation to allow for a reasonable termination of the iterative process.

The channel estimate h may be corrected in three steps. In the first step, the correction vector matrix to be permanently stored in the receiver is found. The training sequence vector s of length L is given by equation (1) above. The matrix A is assembled from values of the vector s as given by equation (2).

The L×L training sequence auto-correlation matrix $R_{sq}$ can then be computed from the matrix A using the following equation:

$$R_{sq}=A^T A \quad (5)$$

A matrix $R_{sq}^n$ containing elements given by the following equation can then be defined:

$$R_{sq}^n[i,j] = \begin{cases} \frac{R_{sq}[i,j]}{\|s\|_2^2} & \text{for } i \neq j \\ 0 & \text{for } i = j \end{cases} \quad (6)$$

where i=0, 1, . . . , (L−1), where j=0, 1, . . . , (L−1), and where $\|s\|_2^2$ is the square of the 2-norm of the vector s, as above. The matrix $R_{sq}^n$ is permanently stored in the receiver and its columns form a set of shifted and truncated correction vectors.

In the second step, the raw channel estimate $\hat{h}_u$ is found according to equation (4) by cross-correlating the known training sequence in the form of the matrix A with the received training vector y that is given by equation (3). As previously explained, the raw channel estimate in the form of the cross-correlation vector $\hat{h}_u$ may contain a substantial amount of baseline noise due to the effect of the finiteness of the cross-correlation. As described above, the channel impulse response may be defined as having a length L such that $L=(L_a+L_c+1)$, where $L_a$ is the length of the anti-causal portion of the channel impulse response and $L_c$ is the length of the causal portion of the channel impulse response.

In the third step of correcting the channel estimate, the baseline noise is reduced from the raw estimate using Algorithm 1 set out below or, alternatively, the baseline noise is reduced from the raw estimate using Algorithm 2 also set out below.

Algorithm 1 involves iteratively subtracting shifted and scaled versions of the correction vectors given by the columns of the matrix $R_{sq}^n$ from the channel estimate in order to reduce the baseline noise due to the finiteness of the correlation used in calculating the raw channel estimate. Ghost paths in the raw channel estimate must have a strength above a given threshold in order to be selected for a noise reduction iteration.

Algorithm 1: Iterative Cleaning Algorithm for Each Path

```
1.  h_e = ĥ_u, threshold = αĥ_u[0] where 0 < α < 1
2.  h_e = h_e − h_e[0]R_sq"[:,L_a];
3.  Loop
        Find next largest spike in ĥ_u at location n−L_a
        if h_e[n−L_a] > threshold
            h_e = h_e − h_e[n−L_a]R_sq"[:,n];
        else
            terminate the loop
        end if
    end loop
```

In the first line of the algorithm, a threshold value threshold is calculated such that the threshold value threshold is a fraction $\alpha$ of the strength of the main peak $\hat{h}_u[0]$ of the cross-correlation vector $\hat{h}_u$. The fraction $\alpha$, for example, may be 0.15. Also, in the first line of the algorithm, a vector $h_e$ is set equal to the cross-correlation vector $\hat{h}_u$.

In the second line of the algorithm, a pre-stored correction vector, i.e., column $L_a$, is selected from the matrix $R_{sq}''$ that contains a set of such correction vectors. Column $L_a$ corresponds to the main peak of the channel estimate. As indicated above, the matrix $R_{sq}''$ is based on the autocorrelation of the known training sequence and contains a set of correction vectors that are related to shifted versions of the noise component. The pre-stored correction vector, i.e., column $L_a$, is scaled by the main peak $h_e[0]$ of the vector $h_e$, and this scaled pre-stored correction vector, i.e., $h_e[0] R_{sq}''[:, L_a]$ is subtracted from the vector $h_e$ to produce a new vector $h_e$.

In the loop defined by the third through the tenth lines of the algorithm, the next largest cross-correlation peak at location n−$L_a$ is selected from the cross-correlation vector $\hat{h}_u$. If the peak at location n−$L_a$ in the vector $h_e$ is greater than the threshold value threshold, then column n−$L_a$ from the matrix $R_{sq}''$ is scaled by the peak from the vector he at location n−$L_a$ and that scaled column, $h_e[n-L_a]R_{sq}''[:, n]$, is subtracted from the vector $h_e$ determined in the second line of the algorithm to produce a new vector $h_e$. The loop in lines three through ten of algorithm is repeated until the vector $h_e$ contains no peaks greater than the threshold value threshold. Accordingly, the loop iterates to produce a succession of channel estimates h of improved accuracy. The final vector $h_e$ at the end of the iterations is the cleansed version of the raw channel estimate $\hat{h}_u$.

An alternative method for improving the channel impulse response estimate is in the form of Algorithm 2. Algorithm 2 involves the simultaneous subtracting of multiple shifted and scaled correction vectors (the columns of the matrix $R_{sq}''$) from the channel estimate. As in the case of Algorithm 1, Algorithm 2 starts with the raw channel estimate $\hat{h}_u$ and the matrix $R_{sq}''$ as before. Algorithm 2 then cleans the raw channel estimate noise due to all ghost paths having a strength above a given threshold all at once (in a single operation). Furthermore, Algorithm 2 is extended so that it operates multiple times, each time lowering the threshold, thus revealing more ghost paths in the resultant channel estimate allowing more baseline noise to be removed.

Algorithm 2: Iterative Cleaning Algorithm for All Paths at a Time

```
1.  h_e = ĥ_u, h_prev = h_e
2.  0 < δ << 1
3.  0 < α < 1, threshold = α ĥ_u[0]
4.  λ < 1
5.  Loop
        i) for k = −L_a ... L_c
            if h_e[k] > threshold
                h_e,th[k] = h_e[k]
            else
                h_e,th[k] = 0
            end if
        end for
        ii) h_e = ĥ_u − (R_sq")^T h_e,th
        iii) if ||h_e − h_prev|| > δ
                h_prev = h_e
                threshold = λthreshold
            else
                terminate loop
            end if
    end loop
```

As in the case of Algorithm 1, the cross-correlation vector $\hat{h}_u$ and the matrix $R_{sq}''$ are inputs to Algorithm 2.

In the first line, a vector $h_e$ is set equal to the cross-correlation vector $\hat{h}_u$ and a vector $h_{prev}$ is set equal to $h_e$.

In the second line of Algorithm 2, a predetermined change factor $\delta$ is set to a value much closer to 0 than to 1. A typical value for $\delta$ may be 0.02. The predetermined change factor $\delta$ can be stored in memory or otherwise.

In the third line, a threshold value threshold, i.e., $\alpha \hat{h}_u[0]$, is calculated as a fraction $\alpha$ of the strength of the main peak $\hat{h}_u[0]$ of the cross-correlation vector $\hat{h}_u$. A typical value for the fraction $\alpha$ is 0.15. The fraction $\alpha$ can be stored in memory or otherwise.

In the fourth line, a threshold reduction factor $\lambda$ is set to a value less than 1. A typical value for the threshold reduction factor $\lambda$ is 0.9. The threshold reduction factor $\lambda$ can be stored in memory or otherwise.

Lines five through twenty form a loop.

In the sixth through twelfth lines of the loop, a vector $h_{e,th}$ having k elements is defined such that each element k in the vector $h_{e,th}$ is set equal to its corresponding element k of the vector $h_e$ if the corresponding element k of the vector $h_e$ is greater than the threshold $\alpha \hat{h}_u[0]$ and is otherwise set equal to zero.

In the thirteenth line, the correction vectors in the matrix $R_{sq}''$ are scaled by $h_{e,th}$ in one step according to $(R_{sq}'')^T h_{e,th}$. Because some of the elements in $h_{e,th}$ are likely to be zero as a result of the operations performed in the sixth through twelfth lines, the operation $(R_{sq}'')^T h_{e,th}$ both selects and scales the correction vectors in the matrix $R_{sq}''$. The selected and scaled correction vectors are then simultaneously subtracted from the cross correlation vector $\hat{h}_u$ to produce a new vector $h_e$.

In the fourteenth through nineteenth lines, if the 2-norm of the difference between this new vector $h_e$ and the previous vector $h_e$, i.e., $h_{prev}$, is greater than the predetermined change factor $\delta$, then (i) the vector $h_{prev}$ is set equal to the new vector $h_e$ determined in the thirteenth line, (ii) a new threshold value threshold is determined by reducing the previous threshold value by the threshold reduction factor $\lambda$, and (iii) the loop consisting of the sixth through the nineteenth lines is repeated. Indeed, the loop is iteratively repeated until the 2-norm of the difference between the vectors $h_e$ and $h_{prev}$ is not greater than the given value of $\delta$.

Figure 2:
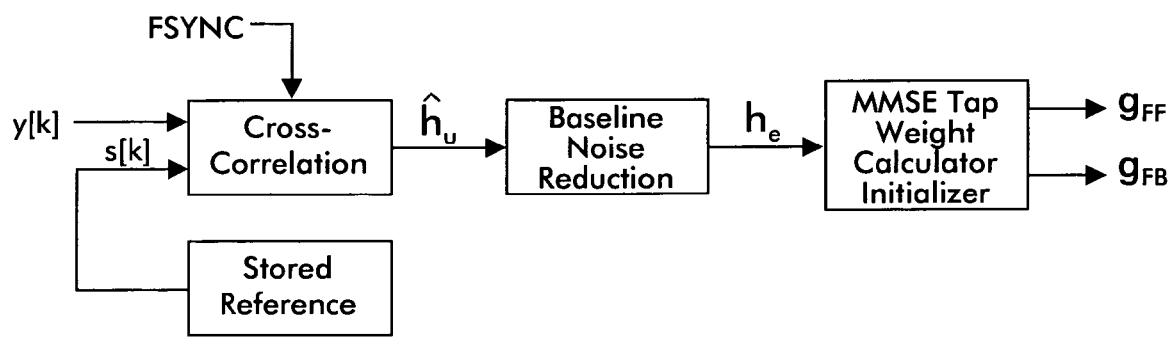
FIG. 2 illustrates a tap weight initializer adjuster that can be used to determine the channel estimate in accordance with the present invention and to initialize the tap weights of the decision feedback equalizer illustrated in FIG. 1 based on the channel estimate.

As shown in FIG. 2, a tap weight initializer 40 for both of the novel techniques described above includes a cross-correlator 42 that cross correlates the received symbols y[k] with the stored training signal s[k] to produce the raw channel estimate $\tilde{h}_u$ in accordance with equation (4) as described above. The operation of the cross correlator 42 is synchronized, for example, to the received training sequence.

A block 44 cleans the "noise," which is caused by the finiteness of the cross correlation, from the raw channel estimate $\tilde{h}_u$ in order to produce the cleansed channel estimate $h_e$ using either of the algorithms described above. The block 44 supplies the cleansed channel estimate $h_e$ to a block 46 that determines the initial minimum mean square error (MMSE) tap weights $g_{FF}$ and $g_{FB}$ utilizing well known methods, such as those described above. The block 46 supplies the tap weights $g_{FF}$ to the feed forward filter 12 and supplies the tap weights $g_{FB}$ to the feedback filter 14.

Modifications of the present invention will occur to those practicing in the art of the present invention. Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method for estimating a channel comprising:
   cross-correlating a known training sequence with received training data to produce a cross-correlation vector, wherein the cross-correlation vector is characterized by a noise component resulting from the finiteness of the cross-correlation;
   calculating a threshold value that is a fraction of the strength of the main peak of the cross-correlation vector; and,
   iteratively selecting, scaling, and subtracting correction vectors from a set of correction vectors based on the known training sequence, wherein the correction vectors in the set of pre-stored correction vectors are related to shifted versions of the noise component, and wherein such selections are based on cross-correlation peaks that are above the threshold value to produce a succession of channel estimates of improved accuracy.

2. The method of claim 1 wherein the set of correction vectors result from an auto-correlation of the known training sequence.

3. The method of claim 1 wherein the iteratively selecting, scaling, and subtracting of correction vectors from the cross-correlation vector comprises selecting a pre-stored correction vector $R_{sq}''[:, L_a]$ and scaling the pre-stored correction vector $R_{sq}''[:, L_a]$ by $h_e[0]$, wherein $h_e[0]$ is based on a main peak of the cross-correlation vector, and wherein $L_a$ designates main peak of the cross-correlation vector.

4. The method of claim 3 wherein the iteratively selecting, scaling, and subtracting of correction vectors from the cross-correlation vector comprises:
   subtracting $h_e[0]R_{sq}''[:, L_a]$ from the cross-correlation vector to form an improved cross-correlation vector; and,
   for each peak of the cross-correlation vector greater than the threshold, selecting and scaling a corresponding one of the correction vectors of the set of pre-stored correction vectors, and subtracting the selected and scaled corresponding correction vector from the improved cross-correlation vector to iteratively form increasingly improved cross-correlation vectors.

5. The method of claim 1 wherein the cross-correlation vector is designated $\tilde{h}_u$, wherein the fraction is designated $\alpha$, wherein the main peak of the cross-correlation vector is designated $\tilde{h}_u[0]$, wherein the calculating of a threshold value that is a fraction of the strength of the main peak of the cross-correlation vector comprises $\alpha\tilde{h}_u[0]$, wherein $h_e=\tilde{h}_u$, wherein the set of correction vectors comprises $R_{sq}''$, wherein a pre-stored correction vector corresponding to the main peak of the cross-correlation vector comprises $R_{sq}''[:, L_a]$, wherein $h_e[0]$ corresponds to the main peak of the cross-correlation vector, wherein the iteratively selecting, scaling, and subtracting of correction vectors from the cross-correlation vector comprises forming $h_e[0]R_{sq}''[:, L_a]$, subtracting $h_e[0]R_{sq}''[:, L_a]$ from $h_e$, and executing the following loop:

```
Find next largest spike in ĥ_u at location n–L_a
if h_e[n–L_a] > threshold
    h_e = h_e – h_e[n–L_a]R_sq"[:,n];
else
    terminate the loop
end if
end loop.
```

6. The method of claim 1 further comprising:
   determining tap weights based on one of the channel estimates having a desired level of improved accuracy; and,
   supplying the tap weights to an equalizer.

7. The method of claim 6 wherein the set of correction vectors result from an auto-correlation of the known training sequence.

8. The method of claim 6 wherein the iteratively selecting, scaling, and subtracting of correction vectors from the cross-correlation vector comprises selecting a pre-stored correction vector $R_{sq}''[:, L_a]$ and scaling the pre-stored correction vector $R_{sq}''[:, L_a]$ by $h_e[0]$, wherein $h_e[0]$ is based on a main peak of the cross-correlation vector, and wherein $L_a$ designates main peak of the cross-correlation vector.

9. The method of claim 8 wherein the iteratively selecting, scaling, and subtracting of correction vectors from the cross-correlation vector comprises:
   subtracting $h_e[0]R_{sq}''[:, L_a]$ from the cross-correlation vector to form an improved cross-correlation vector; and,
   for each peak of the cross-correlation vector greater than the threshold, selecting and scaling a corresponding one of the correction vectors of the set of pre-stored correction vectors, and subtracting the selected and scaled corresponding correction vector from the improved cross-correlation vector to iteratively form increasingly improved cross-correlation vectors.

10. The method of claim 6 wherein the cross-correlation vector is designated $\tilde{h}_u$, wherein the fraction is designated $\alpha$, wherein the main peak of the cross-correlation vector is designated $\tilde{h}_u[0]$, wherein the calculating of a threshold value that is a fraction of the strength of the main peak of the cross-correlation vector comprises $\alpha\tilde{h}_u[0]$, wherein $h_e=\tilde{h}_u$, wherein the set of correction vectors comprises $R_{sq}''$, wherein a pre-stored correction vector corresponding to the main peak of the cross-correlation vector comprises $R_{sq}''[:, L_a]$, wherein $h_e[0]$ corresponds to the main peak of the cross-correlation vector, wherein the iteratively selecting, scaling, and subtracting of correction vectors from the cross-correlation vector comprises forming $h_e[0]R_{sq}{}^n[:, L_a]$, subtracting $h_e[0]R_{sq}{}^n[:, L_a]$ from $h_e$, and executing the following loop:

```
Find next largest spike in ĥ_u at location n-L_a
if h_e[n-L_a] > threshold
    h_e = h_e - h_e[n-L_a]R_sq^n[:, n];
else
    terminate the loop
end if
end loop.
```

11. The method of claim 6 wherein the equalizer comprises a decision feedback equalizer.

12. A method for estimating a channel comprising:
(a) cross-correlating a known training sequence with received training data to produce a cross-correlation vector, wherein the cross-correlation vector is characterized by a noise component resulting from the finiteness of the cross-correlation;
(b) calculating a threshold value that is a fraction of the strength of the main peak of the cross-correlation vector;
(c) selecting and scaling in one step a subset of correction vectors from a set of pre-stored correction vectors based on the known training sequence, wherein the subset of correction vectors is selected based on the threshold value;
(d) simultaneously subtracting all of the selected and scaled correction vectors from the cross-correlation vector to produce a new channel estimate;
(e) reducing the threshold value by a fixed factor; and,
(f) iteratively repeating (c)-(e) until a 2-norm of a difference between the new channel estimate and a previous channel estimate is not greater than a given value, wherein the 2-norm of the difference between the new channel estimate and a previous channel estimate is a Euclidean distance between the new channel estimate and the previous channel estimate.

13. The method of claim 12 wherein the set of pre-stored correction vectors result from an auto-correlation of the known training sequence.

14. The method of claim 12 wherein the selecting and scaling in one step of a subset of correction vectors comprises:
setting each element of either the cross-correlation vector or the new channel estimate to zero only if the element is not greater than the threshold and otherwise not changing the element to produce a matrix $h_{e,th}$; and, scaling the pre-stored correction vectors by $h_{e,th}$.

15. The method of claim 14 wherein $(R_{sq}{}^n)$ comprises the pre-stored correction vectors, and wherein the scaling the pre-stored correction vectors by $h_{e,th}$ comprises multiplying $(R_{sq}{}^n)^T$ by $h_{e,th}$ to produce $(R_{sq}{}^n)^T h_{e,th}$.

16. The method of claim 15 wherein $\delta$ comprises the given value, wherein $\hat{h}_u$ comprises the cross-correlation vector, and wherein the iteratively repeating of (c)-(e) comprises:
subtracting $(R_{sq}{}^n)^T h_{e,th}$ from $\hat{h}_u$ to produce $h_e$;
terminating the iterations if the 2-norm of the difference between $h_e$ and a previous $h_e$ is not greater than $\delta$; and,
if the 2-norm of the difference between $h_e$ and a previous $h_e$ is greater than $\delta$, reducing the threshold by a threshold reduction factor and performing another iteration.

17. The method of claim 12 wherein the cross-correlation vector is designated $\hat{h}_u$, wherein the fraction is designated $\alpha$, wherein the main peak of the cross-correlation vector is designated $\hat{h}_u[0]$, wherein the calculating of a threshold value comprises calculating $\alpha\hat{h}_u[0]$, wherein $h_e=\hat{h}_u$, wherein the set of pre-stored correction vectors comprises $R_{sq}{}^n$, wherein $h_e[k]$ corresponds to the $k^{th}$ element of $h_e$, wherein $\delta$ comprises the given value, wherein $\lambda$ comprises a factor by which the threshold value is reduced, wherein $L_a$ comprises a length of an anti-causal portion of a channel through which the received training data is received, wherein $L_c$ comprises a length of a causal portion of the channel, and wherein (c)-(f) comprises iteratively executing the following loop:

```
Loop
i)      for k = -L_a ... L_c
            if h_e[k] > threshold
                h_e,th[k] = h_e[k]
            else
                h_e,th[k] = 0
            end if
        end for
ii)     h_e = ĥ_u - (R_sq^n)^T h_e,th
iii)    if ||h_e - h_prev|| > δ
            h_prev = h_e
            threshold = λthreshold
        else
            terminate loop
        end if
end loop.
```

18. The method of claim 12 further comprising:
determining tap weights based on one of the channel estimates having a desired level of improved accuracy; and,
supplying the tap weights to an equalizer.

19. The method of claim 18 wherein the set of pre-stored correction vectors result from an auto-correlation of the known training sequence.

20. The method of claim 18 wherein the selecting and scaling in one step of a subset of correction vectors comprises:
setting each element of either the cross-correlation vector or the new channel estimate to zero only if the element is not greater than the threshold and otherwise not changing the element to produce a matrix $h_{e,th}$; and, scaling the pre-stored correction vectors by $h_{e,th}$.

21. The method of claim 20 wherein $(R_{sq}{}^n)$ comprises the pre-stored correction vectors, and wherein the scaling the pre-stored correction vectors by $h_{e,th}$ comprises multiplying $(R_{sq}{}^n)^T$ by $h_{e,th}$ to produce $(R_{sq}{}^n)^T h_{e,th}$.

22. The method of claim 21 wherein $\delta$ comprises the given value, wherein $\hat{h}_u$ comprises the cross-correlation vector, and wherein the iteratively repeating of (c)-(e) comprises:
subtracting $(R_{sq}{}^n)^T h_{e,th}$ from $\hat{h}_u$ to produce $h_e$;
terminating the iterations if the 2-norm of the difference between $h_e$ and a previous $h_e$ is not greater than $\delta$; and,
if the 2-norm of the difference between $h_e$ and a previous $h_e$ is greater than $\delta$, reducing the threshold by a threshold reduction factor and performing another iteration.

23. The method of claim 18 wherein the cross-correlation vector is designated $\hat{h}_u$, wherein the fraction is designated $\alpha$, wherein the main peak of the cross-correlation vector is designated $\hat{h}_u[0]$, wherein the calculating of a threshold value comprises calculating $\alpha\hat{h}_u[0]$, wherein $h_e=\hat{h}_u$, wherein the set of pre-stored correction vectors comprises $R_{sq}{}^n$, wherein $h_e[k]$ corresponds to the $k^{th}$ element of $h_e$, wherein $\delta$ comprises the given value, wherein $\lambda$ comprises a factor by which the threshold value is reduced, wherein $L_a$ comprises a length of an anti-causal portion of a channel through which the received training data is received, wherein $L_c$ comprises a length of a causal portion of the channel, and wherein (c)-(f) comprises iteratively executing the following loop:

```
Loop
 i)    for k = -L_a ... L_c
           if h_e[k] > threshold
               h_{e,th}[k] = h_e[k]
           else
               h_{e,th}[k] = 0
           end if
       end for
 ii)   h_e = h̃_u − (R_sq^n)^T h_{e,th}
 iii)  if ||h_e − h_{prev}|| > δ
           h_{prev} = h_e
           threshold = λthreshold
       else
           terminate loop
       end if
end loop.
```

24. The method of claim 18 wherein the equalizer comprises a decision feedback equalizer.

* * * * *